(12) United States Patent
Souparis

(10) Patent No.: US 9,235,948 B2
(45) Date of Patent: Jan. 12, 2016

(54) METHOD AND DEVICE FOR CHECKING A SECURED DOCUMENT

(75) Inventor: Hugues Souparis, Paris (FR)

(73) Assignee: HOLOGRAM INDUSTRIES, Bussy Saint Georges (FR)

(*) Notice: Subject to any disclaimer, the term of this patent is extended or adjusted under 35 U.S.C. 154(b) by 594 days.

(21) Appl. No.: 13/501,843

(22) PCT Filed: Oct. 14, 2010

(86) PCT No.: PCT/FR2010/052180
§ 371 (c)(1),
(2), (4) Date: Jul. 2, 2012

(87) PCT Pub. No.: WO2011/045543
PCT Pub. Date: Apr. 21, 2011

(65) Prior Publication Data
US 2012/0269402 A1    Oct. 25, 2012

(30) Foreign Application Priority Data

Oct. 15, 2009    (FR) ..................... 09 04948

(51) Int. Cl.
*G07D 7/12* (2006.01)
*G06K 5/00* (2006.01)
*G07D 7/00* (2006.01)

(52) U.S. Cl.
CPC *G07D 7/124* (2013.01); *G06K 5/00* (2013.01); *G07D 7/006* (2013.01)

(58) Field of Classification Search
None
See application file for complete search history.

(56) References Cited

U.S. PATENT DOCUMENTS

| 2005/0175230 | A1   | 8/2005  | Kortum et al. |
| 2005/0237616 | A1 * | 10/2005 | Hillmann ................. G03H 1/22 359/566 |
| 2007/0228166 | A1   | 10/2007 | Lui |
| 2007/0279515 | A1 * | 12/2007 | Miyazaki et al. ............. 348/341 |
| 2008/0144947 | A1   | 6/2008  | Alasia et al. |
| 2009/0153926 | A1 * | 6/2009  | Wiltshire et al. ................. 359/2 |

FOREIGN PATENT DOCUMENTS

| EP | 1852752 A2 | 7/2007 |
| WO | 2006129475 A1 | 12/2006 |

* cited by examiner

*Primary Examiner* — Sumati Lefkowitz
*Assistant Examiner* — Ryan P Potts
(74) *Attorney, Agent, or Firm* — Bachman & LaPointe, P.C.

(57) ABSTRACT

A device for checking a secured object provided with at least one security element for generating sequential or dynamic optical effects according to the orientation thereof and/or the movements applied thereto, has a display screen, a position and/or motion sensor and a device for generating and displaying on the screen a simulation of the nominal security element associated with the secured object, the display depending on the orientation of the device as determined by the position and/or motion sensor, so as to be able to compare the security element of the object to be checked and the simulation according to the respective orientations or movements thereof. A method for checking the secured object is by means of such a device.

14 Claims, 2 Drawing Sheets

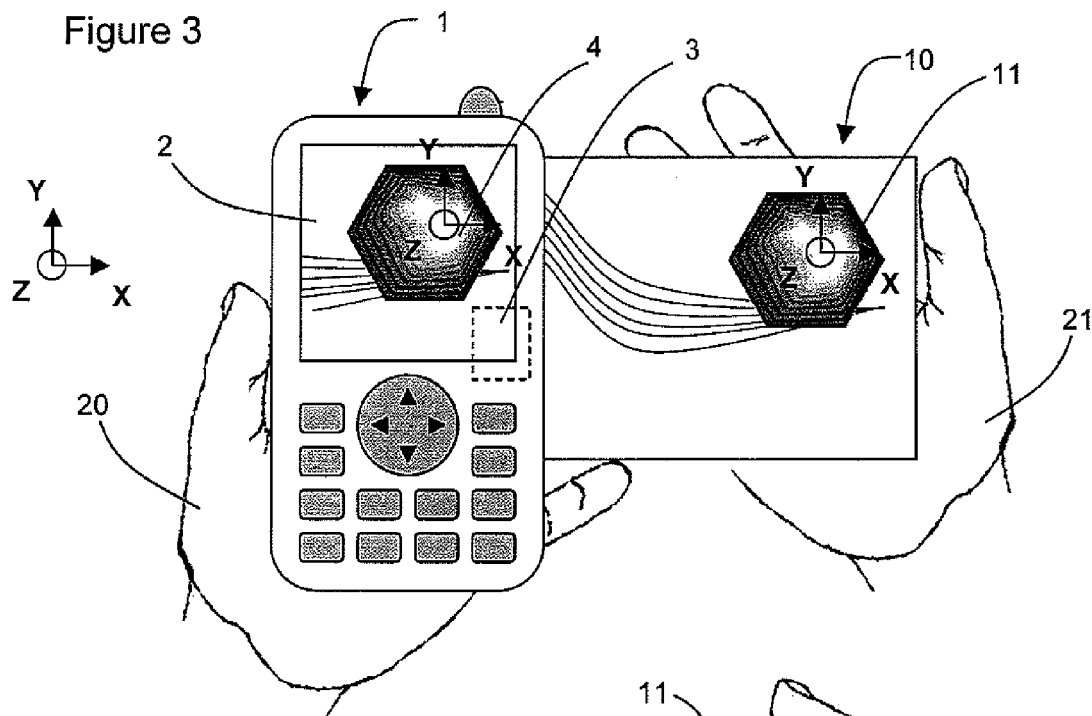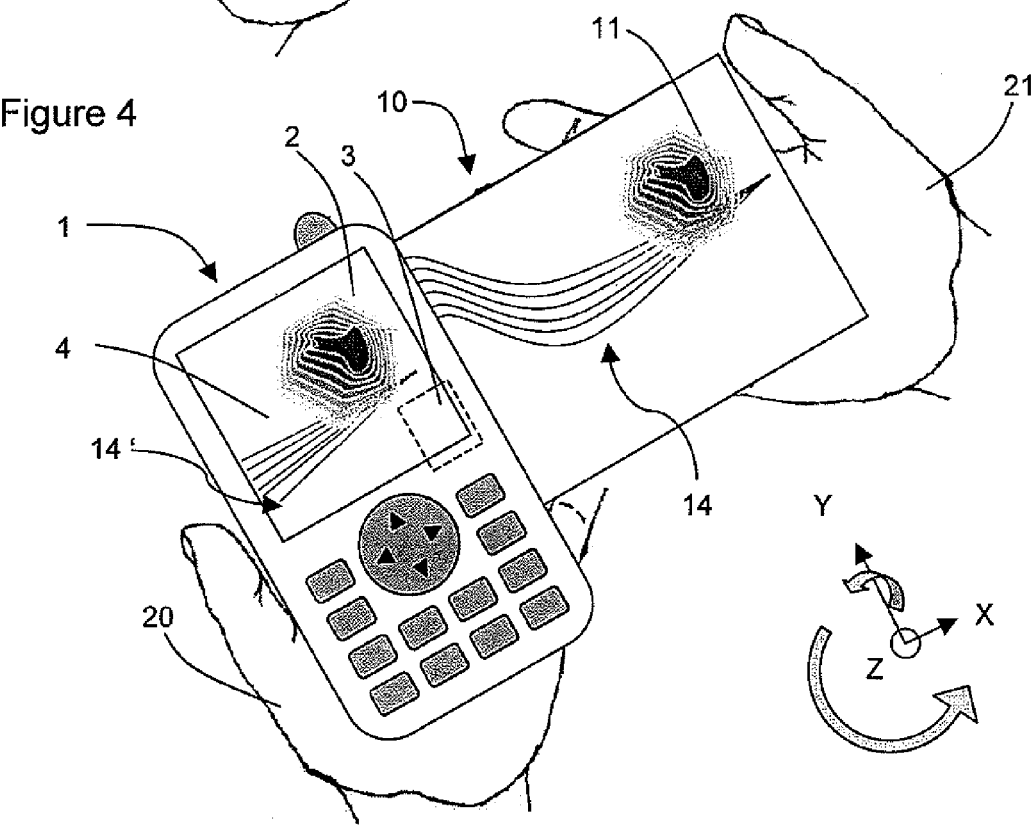

METHOD AND DEVICE FOR CHECKING A SECURED DOCUMENT

BACKGROUND

Technical Field

The present invention relates to the field of authenticating object authentication, for example of documents such as passports or counterfeitable products. To this end, it is common that such objects (documents or products) comprise optically variable security elements to be checked by a controller in order to determine the authenticity of said objects. A controller may be for example an official person in charge of checking, or a non official person for example a consumer.

By optically variable security element, is meant an element whereof at least one of its aspects changes when it is moved.

The movement may be a rotation movement, around a horizontal axis (X axis), a vertical axis (Y axis), and/or of rotation in the plan of the secured object (Z axis).

The aspect changes may be about all or part of the following elements:
 color change according to the orientation
 a change in viewing angles of a 3D hologram
 movement of an image element
 aspect change of the image
 deletion of an image and replacement by another
 etc.

SUMMARY OF THE INVENTION

The present invention more particularly relates to checking a secured object by at least one security element for generating optical effects according to the orientation thereof and/or the movements applied thereto.

Most official documents, such as identity documents, are the target of a large number of counterfeiting attempts or forging of data therein inscribed to replace them and to thus, misuse the document for other purposes than that intended.

Likewise, counterfeiting objects also concerns products, such as for example brand products, pharmaceutical products, high-end products, electronic products, etc.

Counterfeiting also concerns documents of value such as banknotes, checks, show tickets etc.

Such objects may be secured by affixing thereto optically variable security elements according to the orientation thereof and/or the lighting conditions to which they are subjected, such as for example holograms, whereof the optical check allows authentication. The invention thus, relates to the framework of visual authenticity checks of optically variable elements used as authenticators in the battle against counterfeiting.

Moreover, according to a first of its objects, the invention relates to an optical checking method for authenticating a secured object (10) by a controller, said object (10) being provided with at least one optically variable security element (11) for generating optical effects according to the orientation and/or movement thereof with respect to the controller.

According to the invention, the method is substantially characterized in that it comprises the steps of:
 displaying a simulation (4) of a nominal security element associated with the secured object (10) on a display screen (2) of a checking device (1) provided with a module comprising means (3) for measuring the orientation and/or the movement of said module, the display depending on the orientation and/or movement of said module with respect to the controller, and
 comparing the optical effects of the security element (11) with those of the simulation (4) when the orientation and/or the movement of the security element (11) and the module with respect to the controller are the same.

The associated nominal security element may be especially provided to a controller for this checking by comparison.

Thus, by arranging the element to authenticate and the nominal element side by side, the controller may check that these are truly identical thanks to the simulation. In order to do this, given the variation of the optical properties of the element according to its orientation, all that needs to be done is to give the two elements identical orientations or to apply identical movements to them and check each time that the optical properties are still the same. After several orientations or movements and comparisons, the security element will be considered by the controller as authentic if each comparison reveals that both elements were identical.

Thus, typically, it is possible to check the color change of an image element during a rotation around a horizontal axis, the movement of an image element obtained for example for a rotation around the Y axis . . . .

Thus, the controller has means for checking the authenticity of an object with a higher security level since the optical properties of the element can be detected with the naked eye or with the suitable optical properties (magnifying glass or sensors for example). Furthermore, in order to increase the security level, this element may be provided such that it cannot be ripped from the document or from the product—with a view to placing it fraudulently on another document or product—without being integrally damaged, thus making it possible to prevent counterfeiting by merely replacing the security element.

The invention makes checking the authenticity of the document or product particularly easy, and makes it possible thanks to the simulation available to every controller, to display and animate the simulation of any optically variable security element should the simulation be provided to the controller either by dedicated transmission or by storing in a secured database where all the effects are stored. Thanks to the latter, controllers have a greater autonomy since they may, at any time, get the latest updates (new animation corresponding to a new product or a development of the optically variable element.

Thus, thanks to the invention, the authenticity of a product or a document comprising an optically variable security element is carried out by comparison with a particularly reliable coordinate system.

The method may further comprise a step of:
 generating said simulation locally on the checking device (1) or remotely, in this case, the method further comprising a step of downloading said simulation on said device (1).

It is also further provided a step of:
 storing, possibly beforehand, said simulation in a memory accessible (or physically connected) to said device (1).

In an embodiment, the method further comprises a prior step of:
 selecting said simulation (4) of a nominal security element associated with the secured object (10) from amongst a set of nominal security element simulations associated with other secured objects.

Preferably, the selection step comprises steps of:
 identifying the type or the reference of said security element (11) by measuring an optical parameter and/or reading an identifier of said security element (11), and
 searching for the corresponding type or reference from amongst said set of nominal security element simulations.

Alternatively, the selection step comprises steps of:

inputting on input means (5',5") of said device (1), an identifier of said security element (11), and searching for the corresponding type or reference from amongst said set of nominal security element simulations.

In an embodiment, the method further comprises a step of:

applying an orientation and/or a movement with respect to the controller substantially identical to said security element (11) and to said checking device (1) module.

Preferably, the movements with respect to the controller of said security element (11) and said checking device (1) are substantially synchronous.

In an embodiment, the step of comparing the optical effects comprises the appraisal and/or the detection by the controller of at least one of the following aspects:

a color change according to the orientation, a change in viewing angles of a tridimensional hologram, moving of an image element of said security element (11), an aspect change of an image element of said security element (11), a deletion of an image of said security element (11) and possible replacement with another.

In an embodiment, the comparison step is dynamically implemented, the simulation (4) of said nominal security element displayed on said display screen (2) reproducing the orientation and/or the movement of said module at each instant.

According to another one of its purposes, the invention relates to a computer program, comprising program code instructions for implementing the method steps according to the invention, when said program is run on a computer.

The invention also relates to an optical checking system, for the authentication by a controller of a secured object (10), to implement the method according to the invention, the system comprising:

a controller, said object (10), and a checking device (1), said object (10) being provided with at least an optically variable security element (11), for generating optical effects according to the orientation and/or movement thereof with respect to the controller, said system being characterized in that it comprises:

means for displaying a simulation (4) of a nominal security element associated with the secured object (10) on a display screen (2) of said checking device (1) provided with a module comprising means (3) for measuring the orientation and/or the movement of said module, configured so that the display depends on the orientation and/or movement of said module with respect to the controller, and means for comparing the optical effects of the security element (11) with those of the simulation (4) when the orientation and/or movement of the security member (11) and the module with respect to the controller are the same.

Preferably, the means (3) for measuring the orientation and/or the movement of said module comprise a position and/or motion sensor (3) integrated to said device (1).

Preferably, the display screen (2) is integrated to said device (1), said device (1) able to be autonomous and at least partially portable.

Advantageously, at least a simulation (4) is exhibited in the form:

of a set of synthesis images obtained by computer simulation of the optical behavior of the nominal security element, or a video sequence filmed based on the nominal security element, and/or a set of fixed poses obtained based on the nominal security element.

Particularly, the at least partially portable checking device, may be a smart phone, of multimedia type, or a portable electronic assistant, so that a human controller may check a document easily with the naked eye.

To this end, the present invention provides a device for checking a document or a secured product provided with at least one security element for generating optical effects depending on its orientation and movements to which it is subjected, comprising a display screen, a position and/or motion sensor and means for generating and displaying on the screen an animated image of the simulation of the optically variable nominal security element associated with the document or the secured product, the display being driven interactively thanks to a position and/or motion sensor, such as to allow for a comparison between this element, object, product or document, to be checked, and this simulation based on the respective movements and orientations which are applied thereto.

By position and/or motion sensor, is particularly meant, any sensor of accelerometer type, tilt sensor (rotation around an axis), orientation sensor or other making it possible to detect any movement of the device (in the 3 dimensions of space) during the handling by the controller. It provides information pertaining to the orientation variations of the device.

Thanks to the invention, a controller has a checking tool able to take into consideration any recent update of a security element to be checked. In fact, the checking device according to the invention may generate and display a simulation of the nominal security element corresponding to the element to be checked. This simulation may either be integrated to storing means of the device, or downloaded via a secured dedicated server. Hence, a nominal security element that is not provided to the controller may easily and quasi instantaneously be recovered with a view to achieving the compulsory check.

Moreover, the security level of the object is in no way lessened with respect to other solutions of the prior art, in so far as the device uses a position and/or motion sensor which integrates the spatial orientation of the device in order to display on the screen a simulation corresponding to the light intensity and coloring of the nominal element for the orientation or to the animation effect or perception of the relief similar to that of the device. Thus, the device according to the invention behaves like a nominal security element in terms of handling by the controller. The latter may thus handle the device, thus being the equivalent of handling the simulated nominal element to compare it to the element to be checked, such that it is equivalent to using this device and a nominal element on a physical support.

Preferably, the simulation displayed on the screen corresponds to that which is nominally provided for a security element arranged in an orientation substantially identical to the orientation of the device with respect to a reference orientation. This reference may not be the one for a null orientation in the three directions of space so as to take into account what the controller considers as its start position for checking the document.

According to a first embodiment, the device comprises means for communicating with a server via a communication network for downloading the simulation of a nominal security element. This server may be updated regularly in order to integrate any new security element and the checking device may hence directly incorporate such updates.

In this last case, the connection between the communication means and the server is advantageously a secured connection.

According to a second embodiment, the device comprises means for storing information able to contain at least a simulation of a nominal security element. The nominal element is thus directly available on the device, thus saving possible downloading time of its simulation.

Regarding the search for a simulation of a nominal security element, two embodiments may be privileged.

According to a first embodiment, the device comprises data input means to make it possible to search for a simulation of a nominal security element by inputting the alphanumerical reference of this nominal element. In fact, a security element, such as a hologram, frequently has a reference, which the controller only has to enter in the device in order to have access to the simulation of the corresponding nominal security element.

According to a second embodiment, the device comprises acquisition means which make it possible to search for a simulation of a nominal security element by acquisition of the security element to be checked and for automatic recognition of the corresponding nominal element. Such means thus exempts the controller from inputting a security element reference, in so far as the acquisition of one single image is enough to access the required simulation.

For a better security of the document and to prevent different types of frauds, the device comprises means for checking the access to the simulation of a nominal security element based on access rights associated to the holder of this device and determined beforehand.

Preferably, the device comprises means for managing the display of the simulation of a nominal security element on the display screen. This management may consist in adjusting various display parameters.

Furthermore, these display managing means advantageously take into account the lighting conditions of the security element to be checked.

Furthermore, these display managing means may also integrate a function for enlarging the simulation displayed on the display screen.

As regards the simulation of a nominal security element, it may be provided such that it is exhibited in the form:

of a set of synthesis images obtained by computer simulation of the optical behavior of the nominal security element, or of a video sequence filmed based on the nominal security element, or lastly of a set of fixed poses obtained based on the nominal security element.

Advantageously, the device is arranged such as to be at least partially portable, and preferably integrally portable.

The present invention thus, makes it possible to check a secured object, for example a document of value, an identity document or a brand product, provided with at least a security element able to generate optical effects depending on its orientation, by:

generating, on a checking device, a simulation of the nominal security element associated with the secured document, displaying the simulation on a display screen of the device, the display depending on the orientation thereof or the movement applied thereto determined by a position and/or motion sensor integrated to said device, and comparing the element of the document to be checked and the simulation according to their respective orientations.

For the same reasons as those mentioned regarding the aforementioned checking device, this method makes it possible to take into account any recent update of a security element to be checked without the security level of the document being lessened in any way whatsoever with respect to other solutions from the prior art.

BRIEF DESCRIPTION OF THE DRAWINGS

The invention will be better understood upon reading the detailed description of a non limitative embodiment, accompanied with the figs. respectively representing.

On the abovementioned figs., identical references relate, unless otherwise specified, to similar technical characteristics.

DETAILED DESCRIPTION OF THE PARTICULAR EMBODIMENTS

Figure 1:
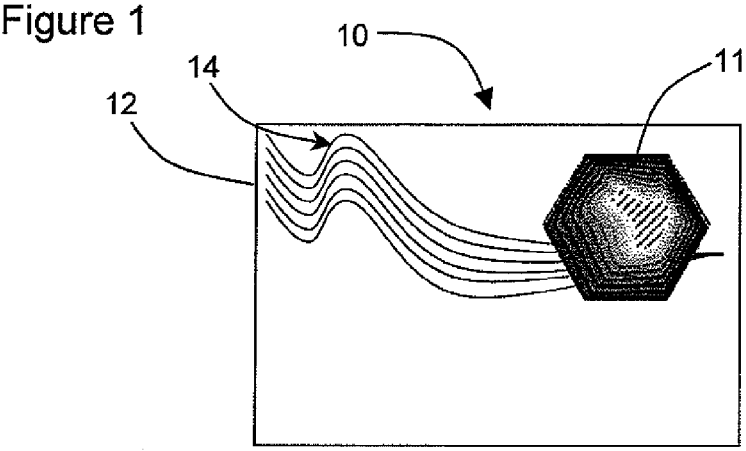
FIG. 1, an example of a secured document provided with a security element.

FIG. 1 represents an example of a secured object 10 provided with an optically variable security element 11 arranged on a physical support 12. This element 11 may be in the form of an optical component comprising means for generating optical effects. Such means may further comprise a transparent or opaque reflecting layer and an embossed layer comprising an optical structure with micro-reliefs. This structure may be constituted by a diffraction network producing visible diffraction effects of order 0 or order 1. Thus, at our disposal is a hologram whereof the optical properties—light intensity, colors, animation effects, angles of vision—vary according to its orientation, movements which are applied thereto as well as its lighting conditions.

Further advantageously, there is on the support 12 at least a non variable graphic element 14, for example a printed example. This non variable graphic element 14 makes it possible for example to locate the graphically variable security element 11 on the support 12 and to make a contrast effect with it, thus, being particularly advantageous in the case where the optically variable security element 11 is a transparent or partially de-metalized hologram, thus also adding a security level to the object 10.

Checking the authenticity of the secured object 10 implies analyzing the element 11 by a controller. In this regard, it is worth noting that an object may comprise several types of security elements, in which case the controller should analyze at least one, or even their entirety.

Figure 2:
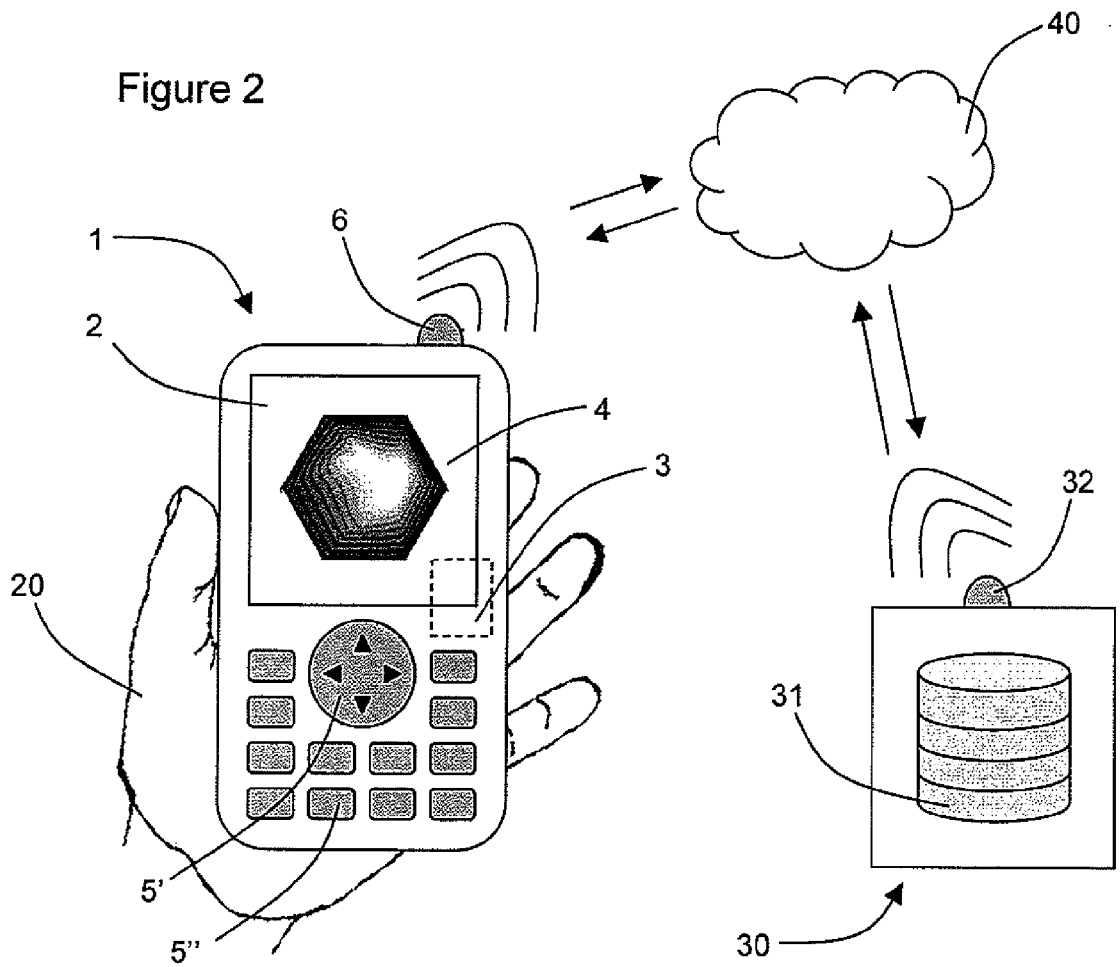
FIG. 2, a diagram of a checking device according to the invention, configured to communicate with a dedicated server, and FIGS. 3 and 4, usage diagrams of the checking device according to the invention during a comparison with a security element to be checked, according to different orientations.

In order to achieve this check according to the present invention, a checking device, represented schematically on FIG. 2 is used and described hereinafter.

This device 1 comprises a casing integrating a display screen 2, a position sensor 3 (in dots), data input means 5' and 5", means 6 for communicating with an outer network, as well as means for generating and displaying (not represented) a simulation of a nominal security element.

The casing of the device 1 is designed in order to be handled single-handedly 20 by a controller. This casing may be designed so as to be integrally portable, thus facilitating the work of the controller, who may thus move about while holding the checking device.

The display screen 2 makes the display of different functionalities possible, and more particularly that of a simulation

4 of a nominal security element associated with a secured document whereof the controller is about to check the authenticity.

Advantageously, the simulation also reproduces (FIG. 4) said at least non variable graphic element 14. Thus, a nominal non variable graphic element 14' simulation is thus displayed associated with said non variable graphic element 14. This characteristic also makes it possible to locate the graphically variable security element 11 on the support 12 and make a contrast effect with it, thus, being particularly advantageous in the case where the optically variable security element 11 is a transparent or partially de-metalized hologram. Thanks to this characteristic, the simulation reproduces the optically variable security element 11 in its real context, i.e., the set of elements present on the support 12 of the object 10, thus also adding a secured layer to said object 10.

The position sensor 3 is integrated to the device 1 such as to provide information on the spatial orientation thereof based on the three directions of space.

The input means may be constituted of keys for managing directions 5' and keys for entering data 5", particularly for searching a simulation 4 and/or a graphic manipulation of the simulation 4.

In this embodiment, communication means are provided so that the device 1 may communicate with a device 30 integrating at least a server 31—dedicated or not—and comprising an adequate communication means 32. This communication may take place via a telecommunication network 40, for example Internet or a local network. Thus, a possible download of simulations of the latest nominal security elements created or updated is ensured, and whereof documents may be provided, such that a controller has rapid access to these simulations without needing any other measure than a mere search and download, whereas the solutions of the prior art required a fastidious search amongst nominal elements on physical support, without knowing for sure as to the availability of the required nominal element.

In addition to this type of accessibility to the simulation of a nominal element, it may be provided that certain simulations be made available at the storing means whereof the device is equipped. The corresponding simulations are thus instantaneously accessible by entering an alphanumerical reference.

Another possibility to access the simulation of a nominal element consists in the acquisition, with acquisition means fitted to the device 1, of an image corresponding to the element 11 to be checked. This image may be processed such as to determine the associated nominal element and to deduce the simulation to be displayed. The skilled person will note here that other possibilities for accessing a simulation may be easily determined within the framework of the invention.

Each simulation 4 is generated then displayed on the screen 2 via the generating and displaying means (not represented) which are the object of the invention. The generation may be completed for example using the abovementioned communication means and/or storing means. These generation and displaying means may come in the form of a processor or micro-processor integrated to the casing of the device and programmed such as to run a program for managing the generation and display of a simulation.

These generation and display means are designed such as to make it possible, on the one hand, to display the simulation of a nominal security element on the screen 2 and, on the other hand, to recognize the spatial orientation or the movement of the device when this display occurs. For this, these means collaborate with the position and/or motion sensor 3, the latter providing it in real time with positioning and movement information based on the three directions of space. The generation and display means thus, integrate this information to determine the shape of the simulation to be displayed. This shape more particularly consists in the light intensity, the color(s), the animation or viewing angles of the simulated element.

This recognition ensures a simulation at several levels of the nominal element, since the latter is able to produce optical effects particularly depending on the orientation thereof and movements applied thereto. The skilled person will note that here other parameters may affect the shape of the security element to be checked, particularly its lighting conditions, and that such parameters may also be taken into account during the generation and display of the simulated object.

As such, when a controller handling the device 1, requires the generation and display of the simulation of the nominal security element associated with that which is being checked, this simulation is displayed on the screen 2. When the device 1 is reoriented in different directions of space, this new orientation and/or the movements which make it possible are measured by the sensor 3 then communicated to the managing and display means, which integrate them to display a new simulation of this nominal element, which is that which corresponds to the simulated element for this new orientation and for the movements applied thereto. The check is hence not only static but is also dynamic.

Now, the usage of this device is described according to the invention with a view to comparing the simulation generated and displayed with the security element to be checked, with reference to FIGS. 3 and 4.

During a check, the controller handles the device 1 and the secured object 10 according to substantially equal directions, and arranges them side by side. Based on the controller aptitude, the device 1 may be handled with one hand 20 and the document 10 with the other hand 21.

When the security element 11 to be checked is authentic, it exhibits the same aspect as the nominal security element originally associated with the object 10 and whereof the simulation 4 is generated and displayed on the screen 2. Hence, the element 11 and the simulation 4 substantially exhibit the same aspect.

FIG. 3 represents a first orientation of these two objects. In the case of an authentic element 11, the latter substantially exhibits the same aspect as the simulation 4 for an orientation substantially similar to device 1 and document 10. On the contrary, it is likely that their aspects differ, however, this cannot be the case if the counterfeit is particularly well done.

In order to distinguish such counterfeits and thus add an additional security level, the device 1 according to the invention and the document 10 may be handled, substantially similarly, in the same direction. This handling as a result dynamically produces animations, changes in color or perspectives, then is stopped according to a second orientation, as illustrated in FIG. 4. This change in orientation leads to the modification of the optical effects generated by the security element. If the security element is really authentic, the dynamic effect during the handling will be substantially identical and when stopped in the same orientations, the aspects of the element 11 and simulation 4 will also be substantially identical. In the case of a fraudulent counterfeit, their aspects may differ to a certain extent.

This check may be completed with other movements and orientations of the two objects 1 and 10 followed each time by a comparison of the element 11 and the simulation 4, thus making it possible to further improve the rigor of authenticity checks.

The dynamic aspect of the check is particularly important. In fact, the simulation of a hologram has hardly any chance of being achieved with strictly identical networks and the amplitude of the movement in passing from one viewpoint of the hologram to the other may easily vary when the networks used are not rigorously similar.

In order to further improve this rigor, it may also be provided that the device 1 comprises means for managing the display of the simulation 4, consisting in the management of different parameters, such as enlarging the simulation 4. The controller thus benefits from a greater operating flexibility as regards the device when it is performing a check.

The skilled person will note that the simulation 4 of a nominal security element must be generated and stored beforehand on an ad hoc support, be it in the form of a dedicated server 31 or a computer storing area. Thanks to this prior generation, the controller may recover the simulation rapidly.

In this respect, it may be noted that there are different forms of simulation generation, these forms may be used indifferently as long as the device 1 is able to read them. All the same, let us take note of the following forms:

a set of synthesis images obtained by computer simulation of the optical behavior of the nominal security element, a video sequence filmed based on the nominal security element, a set of fixed poses (photos or synthesis images) obtained based on the nominal security element.

Thus designed, a checking device according to an embodiment of the aforementioned invention makes, the implementation of a checking method offering a flexibility and rapid checking of a secured document not achieved by the known solutions from the prior art, possible.

This method first comprises a step for generating, on the checking device 1, a simulation 4 of the nominal security element associated with the secured object 10. During, a later step, it then proceeds to the display of this simulation 4 on the display screen 2 of the device 1, this display being based on the movement and/or orientation of the device 1 determined by the position and/or motion sensor 3 integrated to it. A last step finally consists in a comparison between the element 11 of the document 10 to be checked and the simulation 4 for respective substantially identical handlings of the latter.

The aforementioned embodiments of the present invention are given by way of examples and are in no way limiting. It is obvious that the skilled person is able to achieve different alternatives of the invention within the framework of the invention.

The invention claimed is:

1. An optical checking method, for authentication of a secured object, with a handheld checking device provided with a processor or a micro-processor and a display screen; said secured object being provided with at least an optically variable security element, which generates optical effects according to the orientation or movement thereof with respect to an optical sensor, said method comprising the steps of:
providing said handheld checking device with a module comprising a position or a motion sensor for measuring the orientation or the movement of said module;
measuring the orientation or the movements of said handheld checking device with said position or motion sensor;
communicating said measured orientation or movements to said processor or micro-processor in real time;
integrating in said processor or micro-processor said measured orientation or movements to determine a shape of a simulation of a nominal security element associated with said secured object to be displayed;
displaying, on said display screen, said simulation based on the measured movement or the orientation of said handheld checking device determined by said position or motion sensor integrated to it,
dynamically applying identical movements simultaneously to both said module and to said optically variable security element,
capturing images of both said simulation of a nominal security element and said optically variable security element with said optical sensor while being applied identical movements,
retrieving images from said optical sensor, and
comparing, at each instant during the applied movements, the optical effects of the optically variable security element with those of the simulation of the nominal security element on the display screen of said handheld checking device when the orientation or the movement of the secured object and the module with respect to said optical sensor are the same.

2. The method according to claim 1, further comprising the steps of:
generating said simulation locally on the checking device; or remotely and downloading said simulation on said device; and
storing said simulation in a memory accessible to said device prior to the comparison step.

3. The method according to claim 1, further comprising a step of:
selecting said simulation of a nominal security element associated with the secured object amongst a set of simulations of nominal security elements associated with other secured objects prior to the comparison step.

4. The method according to claim 3, wherein the selecting step comprises steps of:
identifying the type or the reference of said nominal security element by measuring an optical parameter and/or reading an identifier of said optically variable security element, and
searching a corresponding type or reference from amongst said set of nominal security element simulations.

5. The method according to claim 3, wherein the selecting step comprises steps of:
inputting through input means of said device, an identifier of said nominal security element, and
searching the corresponding type or reference from amongst said set of nominal security element simulations.

6. The method according to claim 5, wherein the movements of said optically variable security element and said module of the checking device with respect to the optical sensor are synchronous.

7. The method according to claim 1, further comprising a step of:
applying an orientation and/or a movement with respect to the optical sensor identical to said nominal security element and to said module of the checking device.

8. The method according to claim 1, wherein the step of comparing the optical effects comprises appraisal and/or measure and/or detection of at least one of the following aspects:
a color change according to the orientation,
a change in viewing angles of a 3D hologram,
a movement of an image element of said optically variable security element,
an aspect change of an image of said optically variable security element, a deletion of an image of said optically variable security element and possible replacement by another.

9. The method according to claim 1, wherein the comparison step is implemented dynamically, the simulation of said nominal security element displayed on said display screen reproducing the orientation and/or the movement of said module at each instant.

10. An optical checking system, for authentication of a secured object, for implementing the method according to claim 1, the system comprising:
a handheld checking device provided with,
a module comprising a position or a motion sensor for measuring the orientation or the movement of said module;
a display screen for displaying a simulation of a nominal security element associated with the secured object, and
a processor or a micro-processor programmed to run a program for determining a shape of a simulation of a nominal security element associated with said secured object to be displayed on said display screen, based on the movement or the orientation of said handheld checking device determined by said position or motion sensor integrated to it.

11. The optical checking system according to claim 10, further comprising:
an optical sensor, and
a secured object provided with at least an optically variable security element for generating optical effects depending on the orientation and/or movement thereof with respect to said optical sensor, wherein said processor or a micro-processor is programmed such as to run a program for comparing the optical effects, retrieved by said optical sensor, of the optically variable security element with those of the nominal security element of the simulation when the orientation and/or the movement of the optically variable security element and the module with respect to said optical sensor are the same.

12. The optical checking system according to claim 10, wherein said optically variable security element is provided with at least a non variable graphic element;
said simulation simulating a nominal non variable graphic element associated with said non variable graphic element.

13. The optical checking system according to claim 10, wherein at least a simulation is found in the form of:
a set of synthesis images obtained by computer simulation of the optical behavior of the nominal security element, or
a sequence filmed based on the nominal security element, or
a set of fixed poses obtained based on the nominal security element.

14. The method according to claim 1, wherein the microprocessor is programmed such as to run a program for comparing the optical effects of the optically variable security element with those of the nominal security element of the simulation when at least one of the applied orientation and the movement of the optically variable security element and of the module with respect to said optical sensor are identical, the comparing step being performed by said micro-processor.

* * * * *